United States Patent [19]

Wagner

[11] Patent Number: 4,595,229
[45] Date of Patent: Jun. 17, 1986

[54] COMBINATION TRUCK BED, LINER, AND SECURING STRUCTURE

[75] Inventor: James A. Wagner, Elkhart, Ind.
[73] Assignee: LRV Corporation, Elkhart, Ind.
[21] Appl. No.: 596,670
[22] Filed: Apr. 4, 1984
[51] Int. Cl.[4] .............................................. B62D 33/00
[52] U.S. Cl. ................................ 296/39 R; 296/35.3; 248/510; 411/547; 411/548
[58] Field of Search ...................... 29/401.1; 296/39 R, 296/10, 24 R, 190, 35.3, 102; 224/42.42; 248/5.0; 411/427, 547–548; 280/770; 24/290, 135 R, 574–576; 269/904

[56] References Cited

U.S. PATENT DOCUMENTS

| | | | |
|---|---|---|---|
| 2,208,358 | 7/1940 | Chander | 24/135 R X |
| 3,525,190 | 8/1970 | Saunders et al. | 24/290 X |
| 3,649,065 | 3/1972 | Stutz | 296/167 |
| 4,181,349 | 1/1980 | Nix et al. | 296/39 R |
| 4,333,678 | 6/1982 | Munoz et al. | 296/39 R |
| 4,420,183 | 12/1983 | Sherman | 296/39 R X |

Primary Examiner—David A. Scherbel
Assistant Examiner—Russell D. Stormer
Attorney, Agent, or Firm—James D. Hall

[57] ABSTRACT

A combination of a truck bed having side walls with an upper edge and a flange on the inner side extending downwardly from the upper edge, a liner for the bed having side walls positioned along the inner side of the flanges on the bed side wall, and a plurality of fixtures slidably securing the liner side walls to the respective flanges. The fixtures include a bracket seated on the inner side of the respective flange and on the outer surface of the liner side wall and screws, preferably of the self-tapping type, extending through the adjacent liner side wall into the bracket to hold the respective side wall against the flange in slidable relationship. In one embodiment, the bracket consists of two L-shaped parts, one in normal position and the other inverted, and in another embodiment, the bracket consists of a horizontal U-shaped member with one flange seating on the inner side of the wall flange and the other flange seating on the outside wall of the liner, and one or more screws hold the liner and bracket in secured, but slidable, position relative to the wall flange of the bed.

10 Claims, 5 Drawing Figures

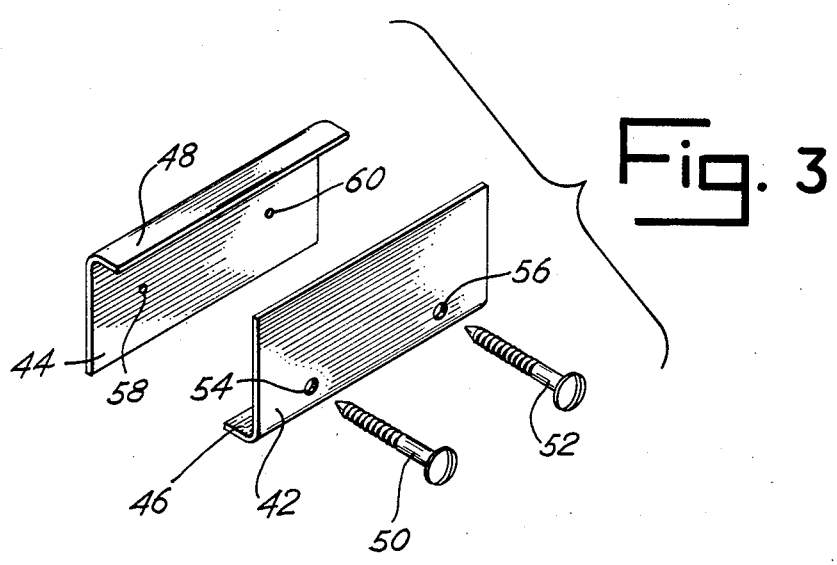
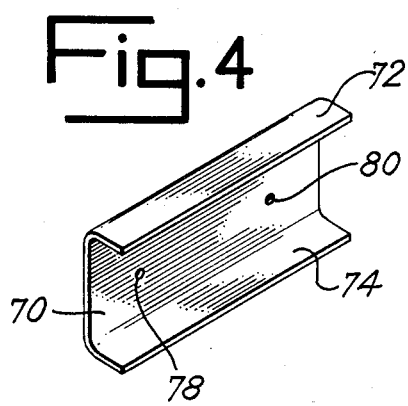
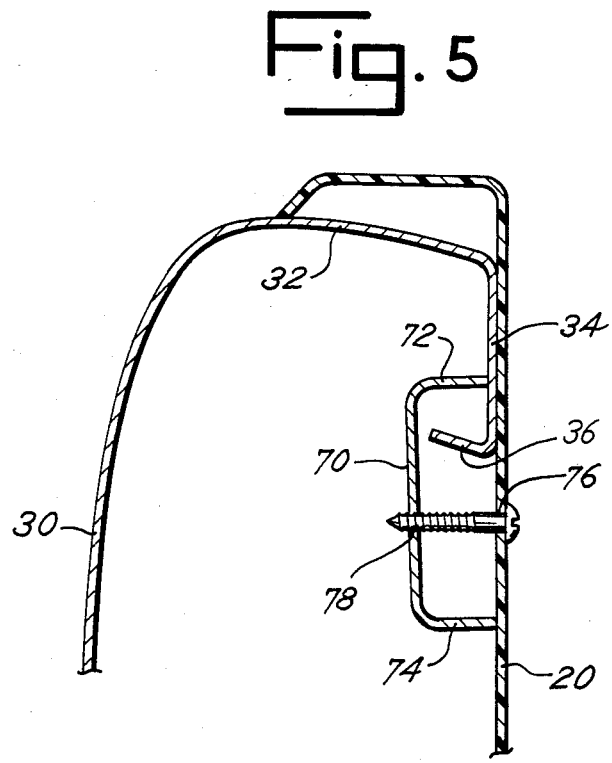

COMBINATION TRUCK BED, LINER, AND SECURING STRUCTURE

BACKGROUND OF THE INVENTION

The present invention relates to a system and fixture for securing liners in pickup truck beds, and the like. In new pickup trucks, for example, the walls of the truck bed are painted, usually with a color similar to that on the external side walls of the vehicle. When the trucks are new, the beds, which can be easily seen from outside the vehicle, appear essentially as attractive as the external finish on the vehicle. However, with use of the truck to haul materials, packages, and other articles, particularly those which are relatively heavy, the bottom and sides often become scratched and scraped to the extent that the metal of the bottom and side walls becomes exposed and, hence, often rusted and discolored. This seriously detracts from the appearance of the truck bed and, unless the bed is used strictly for industrial or agricultural use, it is often unsuited for other less demanding uses of the vehicle, such as for family errands or mere transportation. In order to prevent this damage to the internal walls of the truck bed from occurring, industry has developed and used a liner, which fits into the bed on the bottom and against the forward and side walls, and provides effective protection to the side walls, so that, when the truck is to be used for only transportation and similar purposes, or is to be sold, the liner can be removed and the original paint then exposed in substantially the same condition as it was when the truck was initially purchased. Further, the liner normally is made of plastic material which will withstand the abrasive effect of the materials or products hauled in the truck, and can be cleaned more effectively than the original truck bed.

In the past, in order to secure the liner in place in the truck bed, the liner was provided with outwardly extending flanges at the upper edges of the two side walls, with the flanges extending outwardly over the upper edge of the two sides of the bed and in close proximity thereto. Holes were then drilled through the flanges into the upper edges of the sides of the truck bed, and screws were inserted therein to secure the flanges and, hence, the liner in place in the bed. This type of structure, which was extensively used in the trade to secure the liner in place, had several disadvantages, including the drilling of holes in the upper edges of the new side walls of the bed, which exposed the bare metal in the side walls of the truck and, hence, permitted corrosion to take place, so that when the truck was to be sold, the upper edges of the side walls were disfigured and, hence, were likely to decrease the amount which would otherwise be paid by the purchaser of the used truck. Further, the truck liners being of a plastic material and the truck beds being of a metal material resulted in nonuniform expansion when they were subjected to heat and cold; hence, there was a tendency for the flanges and portions of the side walls of the liner to buckle as the bed and liner were exposed to the hot sunshine. This placed a strain on the liner and, in some instances, resulted in cracking of the flanges in and around the screws, eventually requiring replacement of the liner. Since the truck beds are of sheet metal, the exposed metal around the holes of the securing screws readily rusted and disintegrated, so that substantial damage was done to the upper edges of the sides of the bed and sometimes resulted in the loosening of the screws and, hence, loosening of the liner in the bed.

SUMMARY OF THE INVENTION

It is, therefore, one of the principal objects of the present invention to provide a structure for securing a liner in a truck bed, in which no holes are drilled in the side walls or at any other place of the truck bed, and in which the liner is securely held in place without damaging the original structure of the truck bed.

Another object of the invention is to provide a system and fixture for securing a liner in a bed of a pickup truck or the like, which permits the liner and side walls of the bed to expand nonuniformly, without causing any distortion or damage to the liner, and which does not scar or otherwise mar the exposed surfaces of the truck bed walls, while at the same time providing effective protection to the walls from materials, products and articles hauled therein.

A further object is to provide a fixture for securing a liner in the bed of a truck, such as a pickup truck, which is simple in construction and can be readily attached to the side wall of the truck to hold the liner in place, and which can be released and removed so that the liner can be easily removed from the truck bed, without marring the appearance of the internal side walls of the bed.

The present invention is designed for use with conventional pickup truck beds, which have side walls formed by the external sheet metal side walls of the vehicle, with an inwardly extending upper edge and downwardly extending flange along the inside of the bed. The lower edge of the flange portion of metal is normally turned inwardly to provide a lip on the lower edge of the flange. When a liner is to be secured in place, a fixture, having one U-shaped part or two engaging L-shaped parts, is seated on the internal surface of the downwardly extending flange, and one or more self-tapping screws are inserted through holes in the side wall of the liner into holes in the fixture. As the screw is tightened, the side walls of the liner are seated against the external surface of the downwardly extending flange. Since the screws do not extend into the metal of the side walls, but only through the plastic side walls of the liner and through the material of the fixture, the liner can expand and contract in response to changes in temperature without encountering any serious resistance, by slipping the fixture horizontally and/or vertically as it expands and contracts, thereby preventing any buckling or other distortions from occurring in the liner side walls. Further, the fixture permits the liner to adapt itself more effectively to the size and contour of the truck bed, without placing any strain on the liner.

Various other objects and advantages of the present system and fixture for securing liners in truck beds will become apparent from the following description and accompanying drawings.

BRIEF DESCRIPTION OF THE DRAWINGS

FIG. 3 is an exploded, perspective view of one embodiment of a fixture for securing a liner in a pickup truck bed;

FIG. 4 is a perspective view of another embodiment of the fixture for use in securing the liner in the pickup truck bed; and FIG. 5 is a fragmentary, vertical cross-sectional view similar to that of FIG. 2, illustrating the use of the fixture embodiment shown in FIG. 4.

DETAILED DESCRIPTION OF THE PREFERRED EMBODIMENT

Figure 1:
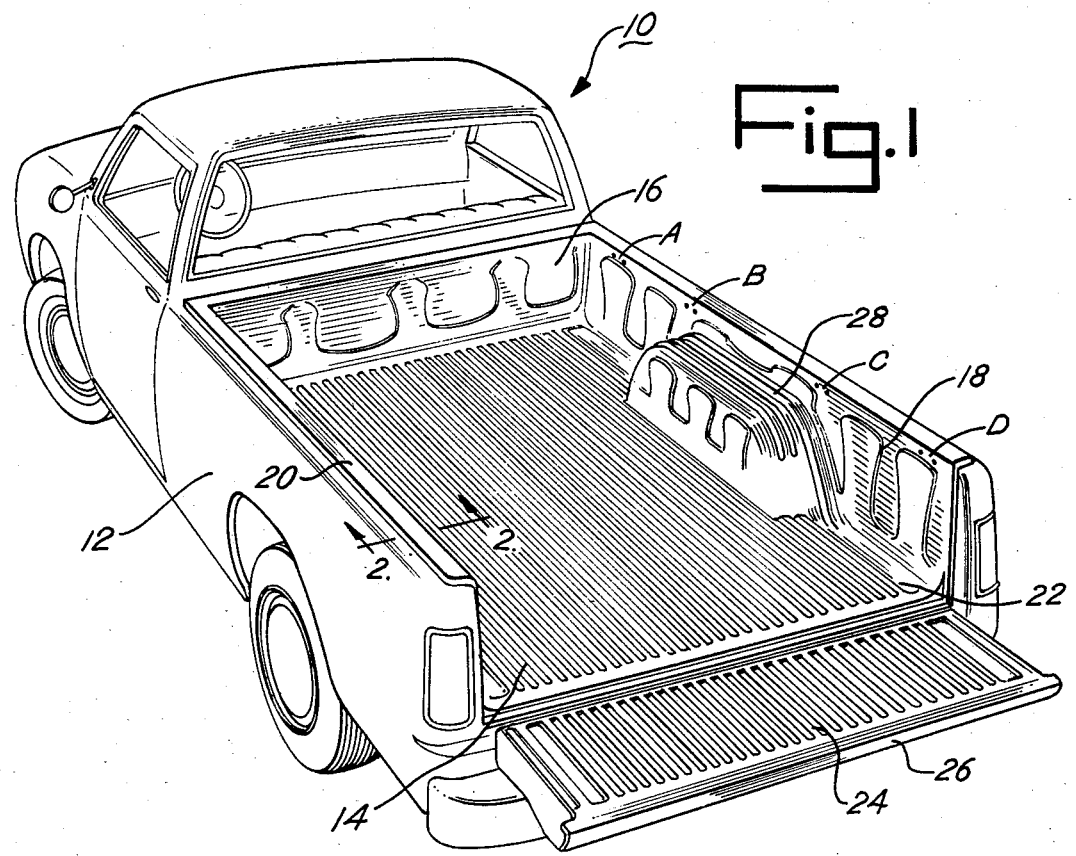
FIG. 1 is a perspective view of a pickup truck showing the bed with a liner secured in place therein, using the system and fixtures of the present invention.

Referring more specifically to the invention, and to FIG. 1 in particular, numeral 10 indicates generally the pickup truck having a bed 12 with a pre-formed liner seated and secured therein. The liner has a front end wall 16, side walls 18 and 20, and bottom 22, the three walls and bottom being formed integrally with one another in the position which they ultimately assume in the truck bed. A liner 24, which is not connected to the pre-formed bed liner, is secured to the internal side of tailgate 26. The liner, which is of a relatively heavy plastic and is normally black, but may be of any desired color, has generally the contour of the inner side walls of the bed, including wells 28 on each side for receiving the wheel wells of the bed. When the liner is installed in the truck bed, it serves as the inner wall, which is in contact with any materials or articles placed in the bed and normally remains permanently in the bed until it is removed for resale. The side walls of the vehicle and truck bed are formed of sheet metal, and have an external panel 30 with an inwardly extending upper edge 32 and a downwardly extending internal flange 34 with a lip 36 extending inwardly from the inside of the bed at the bottom edge thereof. The sheet metal is relatively rigid and retains its shape in normal use of the bed, and the external surface of the upper edge 32, flange 34, and lip 36 is finished in much the same way the external surface of the vehicle is finished.

Figure 2:
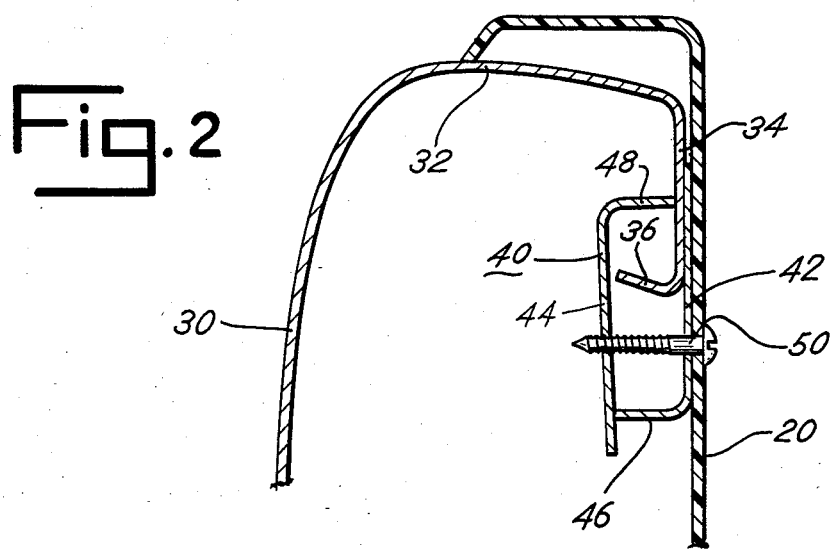
FIG. 2 is a fragmentary, vertical cross-sectional view through the wall of the pickup truck bed and liner therein, the section being taken on line 2—2 of FIG. 1.

The liner is secured in place in the bed by a plurality of fixtures, such as that shown at numeral 40 in FIGS. 2 and 3. The fixture of this embodiment, consisting of two L-shaped members 42 and 44, with flanges or legs 46 and 48, respectively, seating on the outer surface of the flange 34, and engaging the internal surface of flange 34 to form a clamping arrangement when the two members are secured together by screws 50 and 52 extending through holes 54 and 56 in member 42, and into holes 58 and 60 in member 44. The screws are preferably of the self-tapping type, and when they are inserted through holes 54 and 56 and forced into holes 58 and 60, they secure the two parts together in the manner illustrated in FIG. 2. As can be seen in FIG. 1, four fixtures are used along each side, the screws being shown in the side walls at locations A, B, C and D along the right side of the vehicle bed, the screws extending through the holes in the side wall into two members 42 and 44 of the fixture, as previously described.

In the operation and use of the system and fixture for securing a liner in a pickup truck bed previously described herein, the liner is inserted and seated in the bed of a pickup truck, with the flanges of the two side walls of the liner extending outwardly along the upper edge of the side walls of the truck bed, and the internal side walls of the liner extending downwardly along flange 34 of the wall of the bed. The two parts 42 and 44 of the fixture are then assembled, with the screws extending through part 42 and sufficiently into the holes of part 44 to hold the parts generally in the place and position which they will assume when the final assembly has been completed. With the four fixtures at locations A, B, C and D in place, the loosely assembled parts of the fixtures are then assembled in place, with flange or leg 48 of part 44 seated against the inner surface of flange 34. When the four fixtures have been assembled in place along the side walls, the two screws of each fixture are then tightened to the point where the flange 46 of part 42 is against part 44, and flange or leg 48 is against the internal surface of flange 34. The screws, however, are not tightened sufficiently to prevent slight movement of the fixtures relative to the side walls of the bed, thereby permitting the liner to expand and contract without buckling, or otherwise distorting, in response to heat or cold; however, the side walls of the liner and the liner itself are held permanently in place without further adjustment. While the liner is normally not removed during the time one owner has possession of the vehicle, the liner may be removed when the vehicle is to be sold to give the vehicle the maximum effective appearance for resale. The liner can readily be removed from the bed by merely removing the screws of the fixtures. When the screws have been removed, the fixtures are released from the side walls of the truck bed and the side walls of the liner are released from the bed.

A different embodiment of the invention is illustrated in FIGS. 4 and 5. The truck bed and liner are the same as those shown in the drawings and previously described herein, and the fixture consists of a U-shaped member or part 70 having upper and lower flanges or legs 72 and 74, the upper flange seating on the inner surface of flange 34 and the lower flange seating on the outer surface wall 20 of the liner. The screws are inserted through holes 76 in the side walls of the liner into holes 78 and 80 in member 70. As the screws, which are preferably of the self-tapping type, are tightened into holes 78 and 80, the side walls 20 are drawn against flanges 34, and the fixtures, preferably in the general locations of A, B, C, and D, hold the side walls in place along flange 34 of the truck bed side walls and the liner in place in the bed. The embodiment of the fixture shown in FIGS. 4 and 5 has the same advantages as that shown in FIG. 3, i.e. holding the wall of the liner in place along the internal side walls of the bed and the liner in place in the bed while, at the same time, permitting expansion and contraction of the liner side walls without causing any distortion in the side walls of the liner. The liner can be removed in this embodiment, as in the other embodiment, by merely removing the screws along the side walls of the liner, thereby releasing the fixtures and permitting the liner to be removed from the bed.

While only two embodiments of the present invention have been described in detail herein, various changes and modifications may be made without departing from the scope of the present invention.

I claim:

1. The combination of a truck bed having side walls with opposed upper edges and a flange extending downwardly from the upper edge, a liner for the bed having side walls positioned along side of the flanges on the bed side walls and adjacent thereto, and a plurality of fixtures slidably securing the liner side walls to the respective flanges, each fixture including a first generally L-shaped plate seated between the liner side wall and the flange on the respective truck side wall, a leg extending from said first plate towards said truck side wall and seated against a second generally L-shaped plate, a leg extending from said second plate and seated against said flange, and a screw-like means extending through the adjacent liner side wall and said first and second plate members for securing the liner side wall against said flange.

2. The combination defined in claim 1 in which said screw-like securing means consists of two self-tapping screws extending through the liner side wall and through said L-shaped members to secure the side wall to the respective flange in slidable relationship.

3. The combination defined in claim 1 in which said screw-like securing means includes two spaced screws extending through the side wall of the liner onto the bracket means to secure the side wall in place in slidable relationship with the flange.

4. In combination with a truck bed having side walls with opposed upper edges and a flange extending downwardly from said upper ledge, and a liner for the bed having side walls positioned along a side of the flange on the bed side walls and adjacent thereto: a plurality of fixtures for slidably securing the liner side walls to the respective flanges, each fixture including a substantially U-shaped bracket means for seating on the side of the respective flange, said bracket means including a center part and first and second spaced leg portions extending from said center part, one of said first and second leg portions positioned against said flange with the other of said first and second leg portions positioned against said liner side wall, and screw-like means for extending through the adjacent liner side wall into said bracket means to hold the respective liner side wall against the respective flange.

5. The combination defined in claim 4 in which said screw-like securing means includes two spaced screws extending through the liner side wall and through said L-shaped members to secure the side wall to the respective flange in slidable relationship.

6. The combination defined in claim 4 in which said screw-like securing means includes two spaced screws extending through the side wall of the liner into the bracket means to secure the side wall in place in slidable relationship with the flange.

7. A fixture for use in securing a liner in a pickup truck bed having side walls with opposed upper edges and a flange on extending downwardly from the upper edge, a liner for the bed having side walls positioned along the side of the flanges on the bed side walls and adjacent thereto, and a plurality of fixtures slidably securing the liner side walls to the respective flanges, each fixture including a first generally L-shaped plate seated between the liner side wall and the flange on the respective truck side wall, a leg extending from said first plate towards said truck side wall seated against a second generally L-shaped plate, a leg extending from said second plate and seated against said flange, and a screw-like means extending through the adjacent liner side wall and said first and second plate members for securing the liner side wall against said flange.

8. The fixture as defined in claim 7 in which said screw-like securing means includes two spaced screws extending through the liner side wall and through said L-shaped members to secure the side wall to the respective flange in slidable relationship.

9. The fixture as defined in claim 7 in which said screw-like securing means includes two spaced screws extending through the side wall of the liner into the bracket means to secure the side wall in place in slidable relationship with the flange.

10. A fixture for use in securing a liner in a pickup truck bed having side walls opposed upper edges and a flange extending downwardly from said upper edge, and a liner for the bed having side walls positioned along the side of the flanges on the bed side walls and adjacent thereto: a plurality of fixtures for slidably securing the liner side walls to the respective flanges, each fixture including a substantially U-shaped bracket means for seating on the side of the respective flange, said bracket means including a center part, first and second spaced leg portions extending from said center part, one of said first and second leg portions positioned against said flange with the other of said first and second leg portions positioned against said liner side wall, and screw-like means for extending through the adjacent liner side wall into said bracket means to hold the respective liner side wall against the respective flange.

* * * * *

UNITED STATES PATENT AND TRADEMARK OFFICE
CERTIFICATE OF CORRECTION

PATENT NO. : 4,595,229
DATED : June 17, 1986
INVENTOR(S) : James A. Wagner

It is certified that error appears in the above-identified patent and that said Letters Patent are hereby corrected as shown below:

Column 5, line 34, change "L-shaped members" to
--U-shaped bracket means--

Signed and Sealed this

Thirty-first Day of March, 1987

Attest:

DONALD J. QUIGG

Attesting Officer

Commissioner of Patents and Trademarks